（12) United States Patent
Greim et al.

(10) Patent No.: US 8,221,065 B2
(45) Date of Patent: Jul. 17, 2012

(54) TURBOMACHINE BLADE WITH VARIABLE CHORD LENGTH

(75) Inventors: Ralf Greim, Birmenstorf (CH); Said Havakechian, Baden (CH); Ivan McBean, Nussbaumen (CH); Simon-Pierre Monette, Baden (CH)

(73) Assignee: Alstom Technology Ltd, Baden (CH)

( * ) Notice: Subject to any disclaimer, the term of this patent is extended or adjusted under 35 U.S.C. 154(b) by 615 days.

(21) Appl. No.: 12/078,965

(22) Filed: Apr. 8, 2008

(65) Prior Publication Data

US 2010/0284801 A1 Nov. 11, 2010

Related U.S. Application Data

(63) Continuation of application No. PCT/EP2006/067250, filed on Oct. 11, 2006.

(30) Foreign Application Priority Data

Oct. 11, 2005 (CH) .................................. 1643/05

(51) Int. Cl.
*F01D 5/14* (2006.01)
*F01D 1/02* (2006.01)
*F01D 5/02* (2006.01)

(52) U.S. Cl. .................. 415/192; 416/243; 416/DIG. 2; 416/DIG. 5

(58) Field of Classification Search .................. 416/189, 416/243, DIG. 5, 223 A, DIG. 2; 415/192
See application file for complete search history.

(56) References Cited

U.S. PATENT DOCUMENTS

| 2,801,790 | A | * | 8/1957 | Doll, Jr. ...................... 415/210.1 |
| 6,079,948 | A | * | 6/2000 | Sasaki et al. .................. 416/237 |
| 2002/0141863 | A1 | | 10/2002 | Liu et al. |
| 2002/0187039 | A1 | * | 12/2002 | Rinck et al. ................... 415/115 |
| 2003/0035723 | A1 | | 2/2003 | Decker et al. |
| 2004/0062636 | A1 | | 4/2004 | Mazzila et al. |
| 2006/0090936 | A1 | * | 5/2006 | Natanael et al. .............. 175/107 |
| 2009/0317227 | A1 | * | 12/2009 | Grover et al. ..................... 415/1 |

FOREIGN PATENT DOCUMENTS

| DE | 560 687 C | 10/1932 |
| EP | 0 833 060 A2 | 4/1998 |
| EP | 1 098 092 A2 | 5/2001 |
| FR | 2 053 049 A | 4/1971 |
| JP | 56-69405 A | 6/1981 |
| JP | 56069405 A | * 6/1981 |
| JP | 59-115500 A | 7/1984 |

OTHER PUBLICATIONS

Translation of JP-56069405 to Sasada et al.*
International Search Report, Dec. 18, 2006.

* cited by examiner

*Primary Examiner* — Edward Look
*Assistant Examiner* — Jesse Prager
(74) *Attorney, Agent, or Firm* — Buchanan Ingersoll & Rooney PC

(57) ABSTRACT

A blade of a turbomachine, especially of a steam turbine, is characterized in that the chord length ($s_m$) in the middle region of the blade airfoil is shorter than the chord lengths ($s_0$, $S_1$) in the tip-side region or root-side region of the blade airfoil. As a result of this, a distribution of a Zweifel parameter over the longitudinal extent of the blade airfoil is achieved which minimizes the losses of a blade cascade of the blades.

19 Claims, 7 Drawing Sheets

TURBOMACHINE BLADE WITH VARIABLE CHORD LENGTH

TECHNICAL FIELD

The present invention relates to a turbomachine blade. Furthermore, it also includes a rotor and a stator of a turbomachine, especially of a steam turbine, and also includes a turbine machine itself which comprises such blades.

BACKGROUND OF THE INVENTION

In a blade cascade, for example in a stator blade cascade or a rotor blade cascade of a turbomachine, the flow losses are decisively influenced by the so-called pitch ratio. The pitch ratio is defined as the distance between two adjacent blades of a blade row, with regard to the chord length of the blades. The distance in this case is customarily defined in the middle section of the cascade, and therefore results from the circumferential length which is defined on the middle section radius, with regard to the number of blades of the blade row. A higher pitch ratio in this case first of all leads to lower profile losses because the wetted surface area, and the friction losses which occur in the blade boundary layers as a result, decrease. On the other hand, on the outer passage boundary walls, where the flow passage is delimited by the hub or by the casing, the so-called secondary vortices, which are created there, increase in their extent and intensity as pitch ratio increases in such a way that from a defined pitch ratio onwards the losses which are brought about as a result of the secondary vortices overcompensate the reduction of the friction losses. Consequently, there is an optimum pitch ratio which results in minimized losses. The blade cascades are frequently designed with this pitch ratio, or with a pitch ratio which lies very close to the optimum pitch ratio. Losses, which result because of overflowing of working fluid at the blade tip, similarly increase with the pitch ratio.

SUMMARY OF THE INVENTION

It is an object of the present invention, in addition to numerous others, to disclose a new turbomachine blade which is based on a turbomachine blade of the type mentioned in the introduction. More specifically, a turbomachine blade of the type mentioned in the introduction is to be disclosed which enables a further reduction of the overall losses of a blade cascade.

The blade, therefore, has a variable chord length over the longitudinal extent of the blade airfoil. As a result, the Zweifel parameter, the definition and significance of which are familiar to the person skilled in the art, is variably set over the longitudinal extent of the blade airfoil in such a way that the losses of the associated blade cascade are minimized. The Zweifel parameter in this case is set in such a way that this is larger in the middle region of the blade airfoil than at the tip-side or root-side end. In one embodiment of the invention, the chord length distribution is aimed at in such a way that the dimensionless Zweifel parameter in the middle region assumes values of around 0.9, in order to ideally drop to values of around 0.7 towards the tip-side or root-side end of the blade airfoil; in practice, such an idealized distribution in general will be not achieved, and, instead of it, a reasonable approximation is aimed at.

With the turbomachine blade which is described here, therefore, a design for an optimum constant pitch ratio according to conventional criteria is deliberately deviated from, and an increasing of the profile losses is taken into account, which surprisingly leads to a further reduction of the overall losses.

The end of the blade airfoil by which the blade airfoil adjoins the blade root by which it is fastened in the rotor or in the stator, in this case is to be understood by the root-side region of a blade airfoil. The tip-side region of the blade airfoil corresponds to the end of the blade airfoil which is located opposite the root-side region. With a stator blade, the tip-side end corresponds to the hub-side end of the blade airfoil, that is to say, to the end of the blade airfoil which in the installed state comes to lie on the hub of a turbomachine. The root-side end of a stator blade airfoil is consequently also the casing-side end. In the case of the blade airfoil of a rotor blade, the root-side end is the radially inner hub-side end, and the tip-side end is the radially outer casing-side end. The described blade is especially characterized in that the blade airfoil at the root-side end has a root-side chord length, has a tip-side chord length at the tip-side end, and in a middle region of the longitudinal extent has a chord length which is both shorter than the root-side chord length and shorter than the tip-side chord length. The blade airfoil has a maximum chord length, which in one embodiment is at the tip-side end, at the root-side end, or both at the tip-side end and at the root-side end of the blade airfoil.

In one embodiment of the invention, the chord length in the middle region of the longitudinal extent, at the position of the smallest chord length, has values of less than 90%, especially less than 85% or less than 82%, of the maximum chord length. In one development, the chord length in the middle region of the longitudinal extent, at the position of the smallest chord length, has values of more than 70%, especially more than 75% or more than 78%, of the maximum chord length.

In one development of the turbomachine blade which is described here, as a turbomachine rotor blade, especially as a turbomachine rotor blade for an unshrouded rotor blade row, the root-side chord length is shorter than the tip-side chord length; for example, the root-side chord length is less than 95 percent of the tip-side chord length, and in one development more than 90 percent of the tip-side chord length. For strength reasons, it can be necessary for the root-side chord length of a rotor blade to be selected to be the same size as, or even longer than, the tip-side chord length; the latter especially occurs with rotor blades with shroud elements.

With turbomachine stator blades, the root-side chord length is selected to be longer than the tip-side chord length in such a way that the root-side chord length is the maximum chord length.

With blades in which the root-side chord length is the maximum chord length, the tip-side chord length is selected to be less than 95% and/or greater than 90% of the tip-side chord length in specific embodiments.

In one embodiment of the turbomachine blade, the blade airfoil is made so that the outflow angle of the blade airfoil is essentially constant over the whole longitudinal extent of the blade airfoil. That is to say, at each position in the direction of the longitudinal extent of the blade airfoil, the camber lines of the blade airfoil profile extend essentially parallel to each other at the blade airfoil trailing edge; the deviations at the different positions in the longitudinal extent of the blade airfoil are at most 10° and especially at most 6°, and in another embodiment are even at most 4° or 5°. In the middle region of the blade airfoil, the profile curvature in this case in one embodiment is greater than in the tip-side or root-side regions, since the aerodynamic loading is greater on account of the shorter chord length.

The invention is suitable inter alia for the design of steam turbine blades.

Turbomachine blades of the type which is described above, are suitable for example as rotor blades for arranging in a rotor blade row of a rotor of a turbomachine. They are furthermore suitable as stator blades for arranging in a stator blade row of a stator of a turbomachine.

The invention also includes a turbomachine, especially a steam turbine, which comprises a rotor with at least one rotor blade row with blades of the type of construction which is described above, and/or which comprises a stator with at least one stator blade row with blades of the type of construction which is described above.

BRIEF DESCRIPTION OF THE DRAWING

The invention is subsequently explained in more detail based on exemplary embodiments which are illustrated in the drawing. In detail, in the drawing.

Elements which are not necessary for the understanding of the invention are omitted. The exemplary embodiments are to be purely instructively understood, and are not to be considered as a limitation of the invention which is characterized in the claims.

WAY OF EMBODYING THE INVENTION

Figure 1:
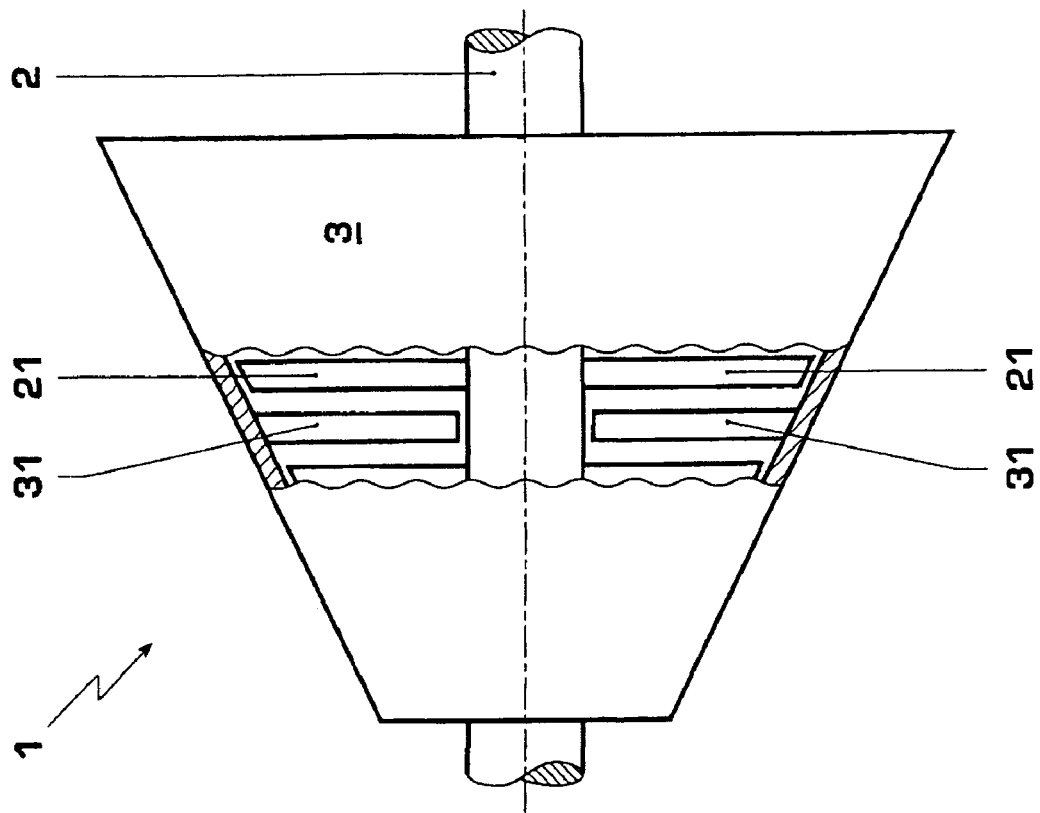
FIG. 1 shows a schematic view of a turbomachine.

In FIG. 1, a turbine, for example a high-pressure steam turbine 1, is schematically shown. The exemplarily shown turbine is exposed to throughflow of a working fluid from left to right. The turbine comprises a rotor and a stator. The rotor comprises inter alia the shaft 2 and also rotor blades 21. The stator comprises inter alia a casing 3 and stator blades 31. A stage of a turbine comprises in each case a stator blade ring and a rotor blade ring which is arranged downstream of it.

Figure 2:
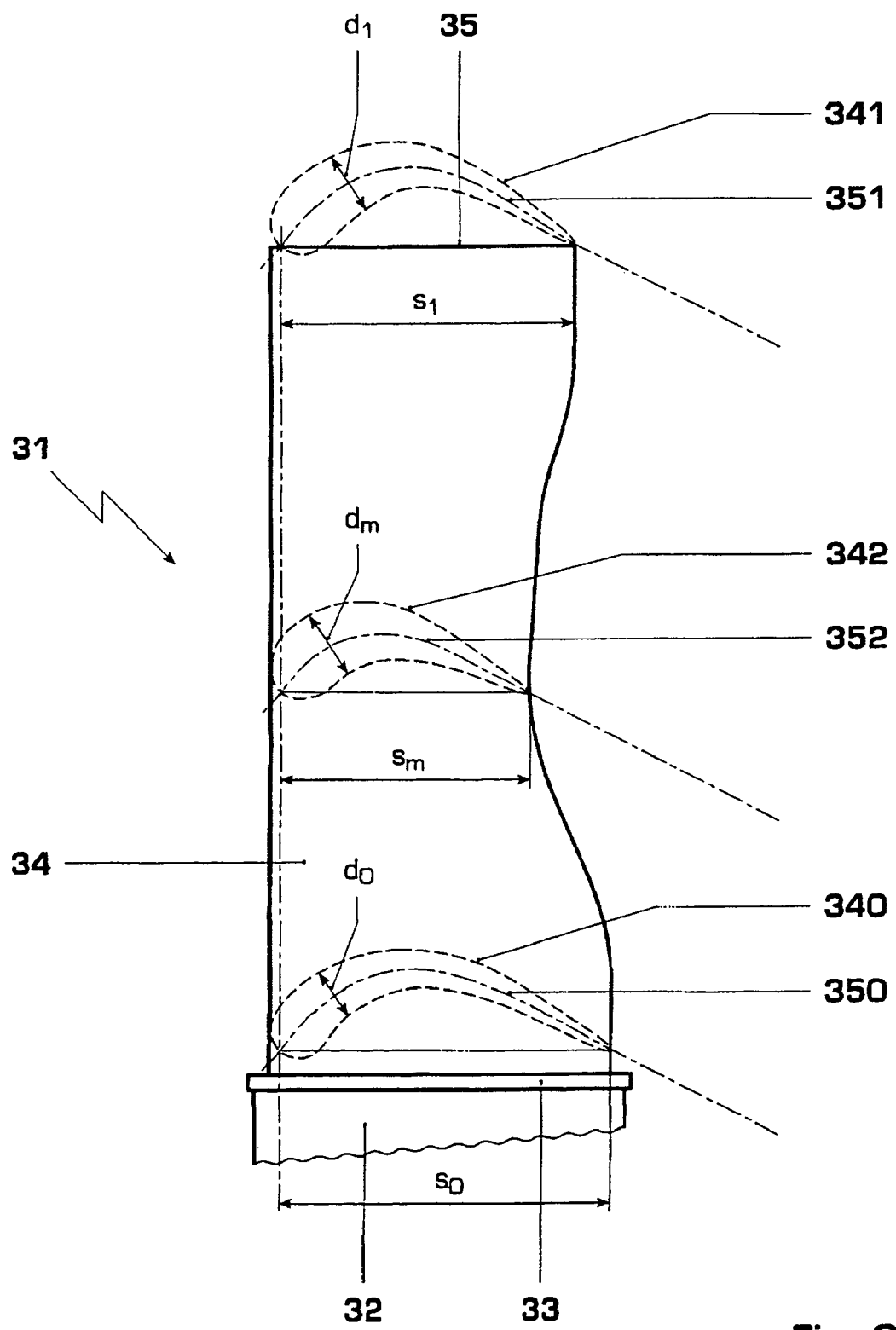
FIG. 2 shows a first example of an untwisted stator blade of the type which is characterized in the patent claims.

In FIG. 2, an exemplary stator blade 31 is shown. The stator blade comprises a blade root 32, a blade platform 33, and also a blade airfoil 34 which is arranged upon the platform. The blade is shown without a shroud; this does not constitute a limitation. In a similar way, the invention can be realized on a blade with a shroud element. The blade which is shown is characterized in that the chord length of the blade airfoil varies along the longitudinal extent of the blade airfoil. In this case, the chord length $s_m$ in the middle region of the blade airfoil is shorter than the chord length $s_0$ in the region of the blade root, and shorter than the chord length $s_1$ in the region of the blade tip 35. Furthermore, the chord length $s_0$ in the region of the blade root is longer than the chord length $s_1$ in the region of the blade tip. The latter is not necessary but occasionally proves to be advantageous since the distance between two blades in the case of a stator blade ring is greater in the blade root region than in the blade tip region; primarily the shortening of the chord length in the middle region of the blade airfoil is vital in order to achieve there an enlargement of the Zweifel parameter in relation to the tip and root regions. Three blade airfoil profiles 340, 341 and 342 are exemplarily shown in the longitudinal extent of the blade airfoil. These are characterized in each case by their camber line 350, 351 and 352, and also by their contour. The tangent of the camber line at the blade leading edge or at the blade trailing edge is essentially identical to the design-compliant inflow direction and the outflow direction of the blade airfoil profile. These directions are the same with all the profiles which are shown here, since it concerns an untwisted blade. The profiles are furthermore characterized by the maximum profile thickness which in the different profiles is identified by $d_0$, $d_1$ and $d_m$. In one embodiment of the invention, the greater the maximum profile thickness, the shorter is the chord length, because the aerodynamic load increases as the chord length becomes shorter. For example, in one embodiment of the invention the maximum profile thickness $d_m$ of the profile 342 is greatest with the shortest chord length.

Figure 3:
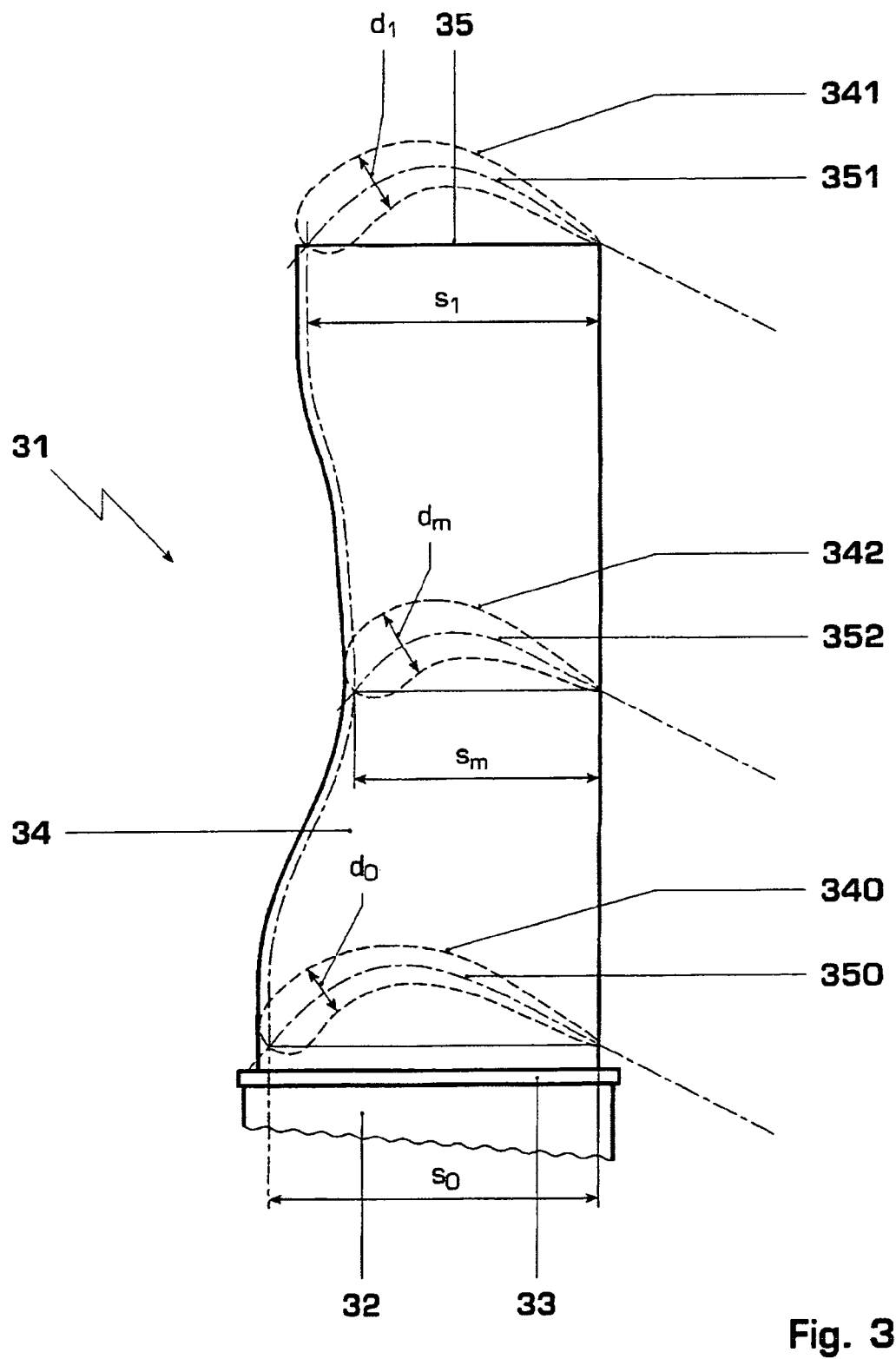
FIG. 3 shows a second example of an untwisted stator blade of the type which is characterized in the patent claims.

In the exemplary embodiment of FIG. 2, the shortening of the chord length has been achieved by a contouring of the blade trailing edge. FIG. 3 illustrates that the desired variation of the chord length can also be achieved by a contouring of the blade leading edge. In a further embodiment, which is not explicitly shown, both the leading edge and the trailing edge are contoured; this possibility naturally also exists in the case of all subsequently shown developments of the invention and is frequently applied in practice.

Figure 4:
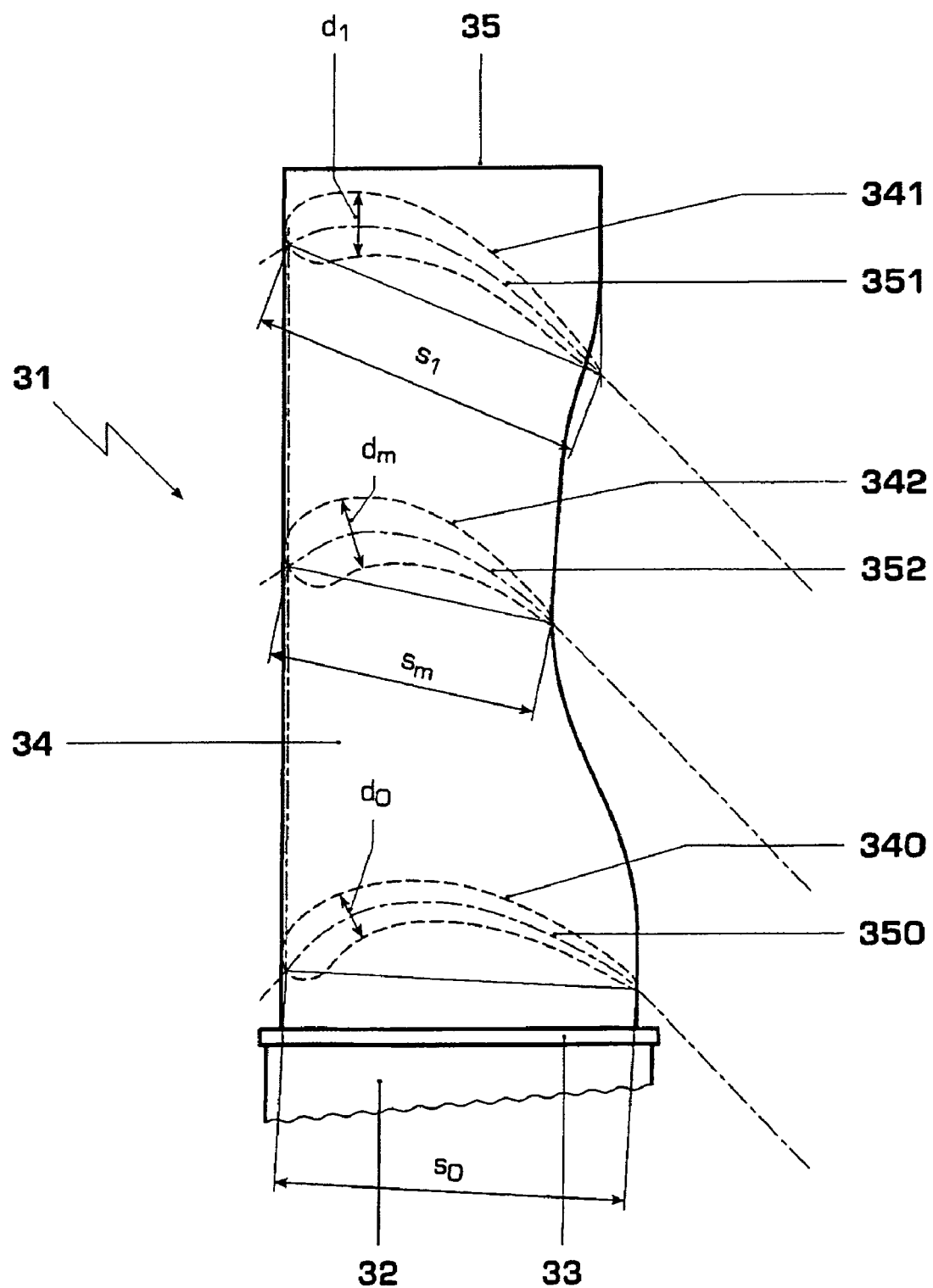
FIG. 4 shows a first example of a twisted stator blade of the type which is characterized in the patent claims.
Figure 5:
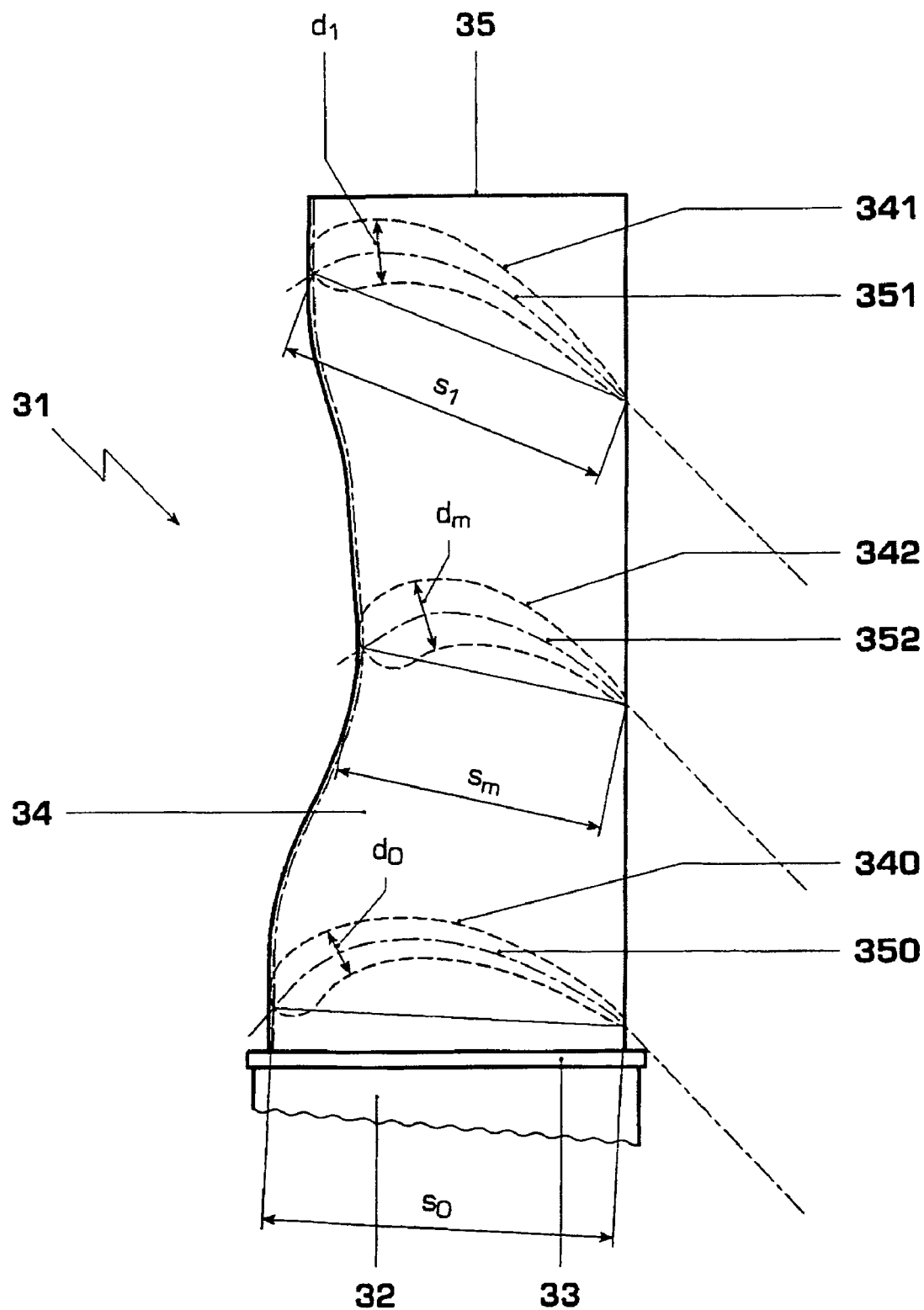
FIG. 5 shows a second example of a twisted stator blade of the type which is characterized in the patent claims.

Exemplary stator blades with a twisted blade airfoil are shown in FIGS. 4 and 5. Again, blade airfoil profiles 340, 341 and 342 are shown in cross section in the longitudinal extent of the blade airfoil 34. The outflow directions are essentially the same in all the blade airfoil profiles. On the other hand, the flow deflection from the blade root 32 towards the blade tip 35 reduces. That is to say, in the longitudinal extent of the blade airfoil the nominal inflow direction as seen from the blade root towards the blade tip comes increasingly closer to the outflow direction. The chord length $s_m$ in the middle of the blade airfoil is shorter than the chord length $s_0$ at the blade root, and shorter than the chord length $s_1$ at the blade tip. Moreover, the chord length $s_0$ at the blade root is longer than the chord length $s_1$ at the blade tip; the comments which are made above apply in this case. FIG. 5 shows in turn that the variation of the chord length can also be carried out by a contouring of the blade leading edge, or also by a contouring both of the blade airfoil leading edge and of the blade airfoil trailing edge.

Figure 6:
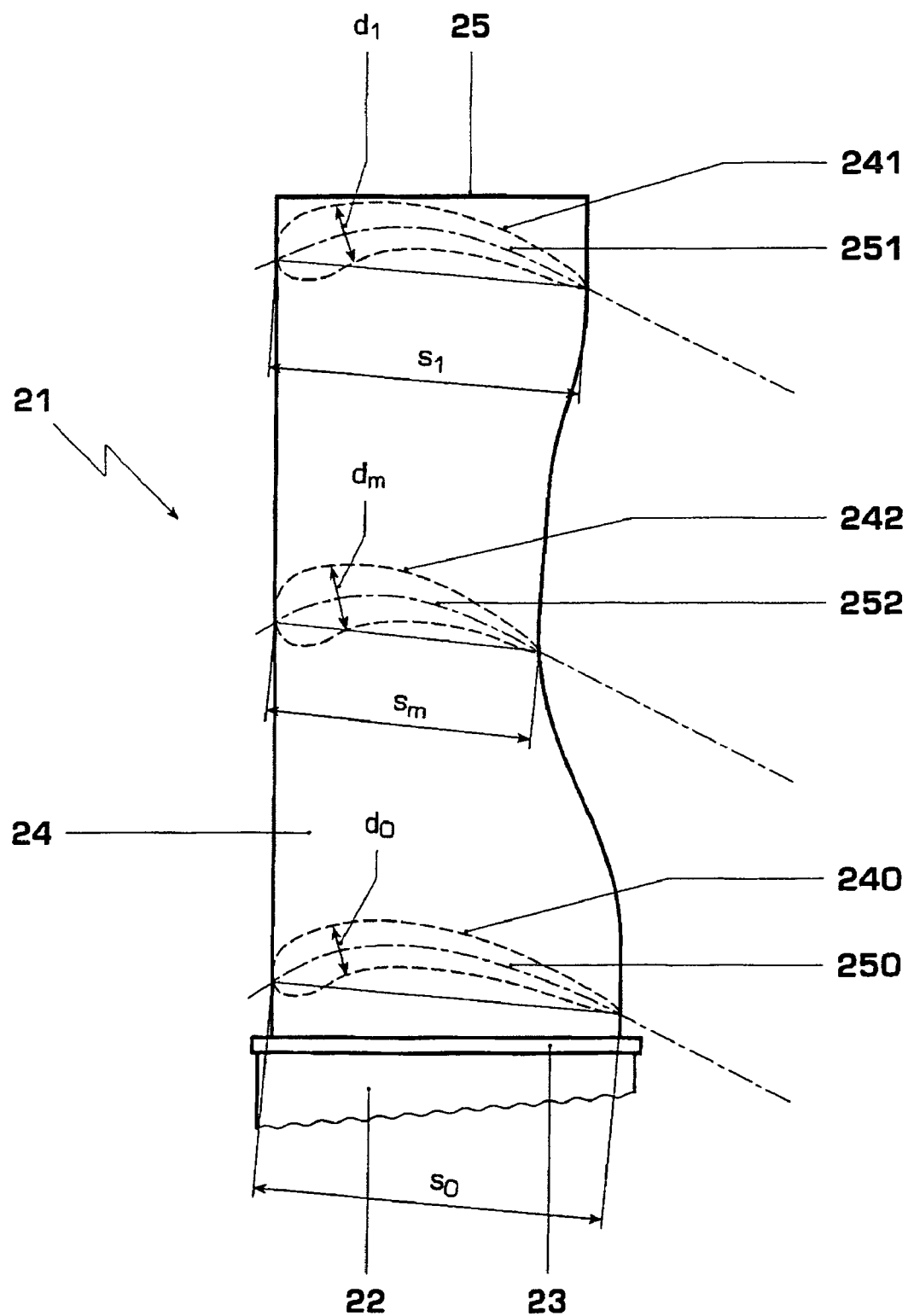
FIG. 6 shows a first example of a rotor blade of the type which is characterized in the patent claims.

In FIG. 6, the implementation of the invention on a rotor blade 21 is illustrated. The rotor blade comprises a blade root 22, a blade platform 23, a blade airfoil 24 and also the blade tip 25. The cross sections of three positions of the blade airfoil are again exemplarily shown. In this case, 240 is the blade airfoil profile in the region of the blade root, 241 is the blade airfoil profile at the blade tip, and 242 is a blade airfoil profile in the middle of the blade airfoil. The directions and the tangents of the camber lines of the blade airfoil profiles at the leading edge and at the trailing edge are essentially identical in each case, that is to say, it concerns an untwisted blade airfoil. The chord length $s_m$ of the blade airfoil profile 242 in the middle of the blade airfoil is shorter than the chord length $s_0$ of the profile 240 which lies in the region of the blade root, and shorter than the chord length $s_1$ of the profile 241 which lies at the blade tip. From a fluidic point of view, it would also here again be desirable if the chord length $s_0$ in the region of the blade root were to be shorter than the chord length $s_1$ in the region of the blade airfoil tip 25, as is exemplarily shown. On the other hand, the blade airfoil cross section in the region of the blade root has to bear the centrifugal force loading of the entire blade root in the case of a rotor blade. This is accentuated more if a shroud element is arranged on the blade airfoil in the tip region. With a rotor blade, therefore, in one embodiment of the invention, which is not shown, the chord length $s_0$ in the region of the blade root is selected the same size as, or even longer than, the chord length $s_1$ in the region of the blade tip 25 when necessary. The blade airfoil profile 242 in the middle of the blade airfoil, on account of the shorter chord length, has a greater profile thickness $d_m$ than the profile thickness $d_0$ of the profile 240 at the blade root and greater than the profile thickness $d_1$ of the profile 241 at the tip of the blade airfoil.

Figure 7:
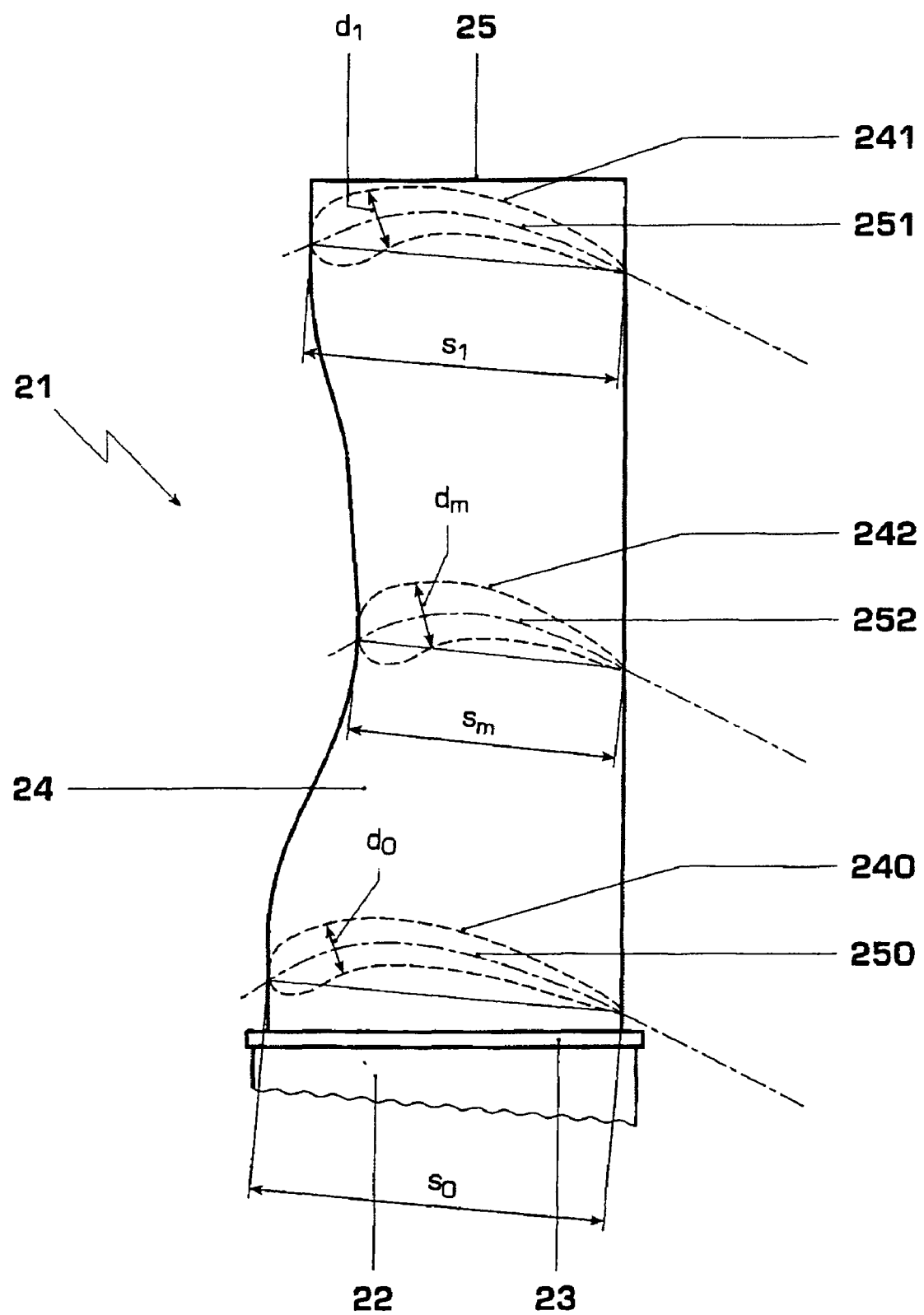
FIG. 7 shows a further example of a rotor blade of the type which is characterized in the patent claims.

While in the case of the exemplary embodiment of FIG. 6 there is a contouring of the blade airfoil trailing edge, the blade airfoil leading edge is contoured in the case of the exemplary embodiment of FIG. 7. It is obvious to the person skilled in the art that in one embodiment, which is not explicitly shown, that both the leading edge and the trailing edge can be contoured.

In the light of these embodiments, further embodiments, which are not explicitly shown in the exemplary embodiments, of the invention which is characterized in the claims, freely present themselves to the person skilled in the art. In particular, the invention can also be applied on blades with other geometric features, such as an inclination or bend of the blade airfoil, or with so-called "twist" or "sweep",—wherein these terms are familiar to the person skilled in the art.

LIST OF DESIGNATIONS

1 Turbomachine, steam turbine
2 Shaft
3 Casing
21 Rotor blade
22 Rotor blade root
23 Rotor blade platform
24 Blade airfoil
25 Blade tip
31 Stator blade
32 Stator blade root
33 Stator blade platform
34 Blade airfoil
35 Blade tip
240 Blade airfoil profile
241 Blade airfoil profile
242 Blade airfoil profile
250 Camber line
251 Camber line
252 Camber line
340 Blade airfoil profile
341 Blade airfoil profile
342 Blade airfoil profile
350 Camber line
351 Camber line
352 Camber line
$d_0$ Maximum profile thickness of a blade airfoil profile
$d_1$ Maximum profile thickness of a blade airfoil profile
$d_m$ Maximum profile thickness of a blade airfoil profile
$s_0$ Chord length
$s_1$ Chord length
$s_m$ Chord length

The invention claimed is:

1. A steam turbine blade, comprising:
a blade airfoil which by a longitudinal extent of the blade airfoil extends from a root-side end to a tip-side end, the blade airfoil having a blade airfoil leading edge and a blade airfoil trailing edge, wherein at one corresponding position of the longitudinal extent, a chord length ($s_o$, $s_1$, $s_m$) is defined from the blade airfoil leading edge to the blade airfoil trailing edge, the blade airfoil including at a root-side end position, a root-side chord length ($s_o$), at a tip-side end position, a tip-side chord length ($s_1$), and in a middle position of the longitudinal extent, a chord length ($s_m$), the chord length ($s_m$) being shorter than the root-side chord length ($s_o$) and shorter than the tip-side chord length ($s_1$),
wherein directions of local camber lines of blade profiles at the blade trailing edge at each position of the blade airfoil, measured in the direction of the longitudinal extent of the blade airfoil, deviate from each other by at most 5°, and
a profile curvature in the middle position is greater than in the tip-side end position or root-side end position, such that a Zweifel parameter is set to be substantially 0.9 at the middle position and substantially 0.7 at at least one of the tip-side end position and the root-side end position.

2. The steam turbine blade as claimed in claim 1, wherein a maximum chord length of the blade airfoil occurs at the tip-side end, at the root-side end, or both at the tip-side end and at the root-side end.

3. The steam turbine blade as claimed in claim 2, wherein the chord length in the middle region of the longitudinal extent is less than 90%, of the maximum chord length of the blade airfoil and is the shortest chord length of the steam turbine blade.

4. The steam turbine blade as claimed in claim 2, wherein the chord length ($s_m$) in the middle region of the longitudinal extent is more than 70%, of the maximum chord length of the blade airfoil and is the shortest chord length.

5. The steam turbine blade as claimed in claim 1, wherein the steam turbine blade is a rotor blade, and the tip-side chord length ($s_1$) is the maximum chord length, and the root-side chord length is shorter than, or equal to the tip-side chord length.

6. The steam turbine blade as claimed in claim 5, wherein the rotor blade is provided for an unshrouded rotor blade row.

7. The steam turbine blade as claimed in claim 1, wherein the steam turbine blade is a rotor blade comprising:
a shroud element, wherein the root-side chord length ($s_o$) is the maximum chord length, and the tip-side chord length ($s_1$) is shorter than, or substantially equal to the root-side chord length.

8. The steam turbine blade as claimed in claim 1, wherein the steam turbine blade is a stator blade, and the root-side chord length ($s_o$) is the maximum chord length.

9. The steam turbine blade as claimed in claim 5, wherein the root-side chord length is less than 95% of the tip-side chord length.

10. The steam turbine blade as claimed in claim 5, wherein the root-side chord length is greater than 90% of the tip-side chord length.

11. The steam turbine blade as claimed in claim 7, wherein the tip-side chord length is less than 95% of the root-side chord length.

12. The steam turbine blade as claimed in claim 7, wherein the tip-side chord length is greater than 90% of the root-side chord length.

13. A rotor of a steam turbine, comprising at least one rotor blade row, the rotor blades of which are steam turbine blades as claimed in claim 1.

14. A stator of a steam turbine, comprising at least one stator blade row, the stator blades of which are steam turbine blades as claimed in claim 1.

15. A steam turbine, comprising:
at least one rotor blade row; and
at least one stator blade row wherein for each blade of the rotor blade row and the stator blade row, a blade airfoil which by a longitudinal extent of the blade airfoil extends from a root-side end to a tip-side end, and which blade airfoil has a blade airfoil leading edge and a blade airfoil trailing edge, wherein at one corresponding position of the longitudinal extent a chord length ($s_o$, $s_1$, $s_m$) is defined from the blade airfoil leading edge to the blade airfoil trailing edge, the blade airfoil including at a root-side end position, a root-side chord length ($s_o$), at a tip-side end position, a tip-side chord length ($s_1$), and in a middle position of the longitudinal extent, a chord length ($s_m$), the chord length ($s_m$) being shorter than the root-side chord length ($s_o$) and shorter than the tip-side chord length ($s_1$),
wherein directions of local camber lines of blade profiles at the blade trailing edge at each position of the blade airfoil, measured in the direction of the longitudinal extent of the blade airfoil, deviate from each other by at most 5°, and
a profile curvature in the middle position is greater than in the tip-side end position or root-side end position, such that a Zweifel parameter is set to be substantially 0.9 at the middle position and substantially 0.7 at least one of the tip-side end position and the root-side end position.

16. The steam turbine blade as claimed in claim 2, wherein the chord length in the middle region of the longitudinal extent is less than 85%, of the maximum chord length of the blade airfoil and is the shortest chord length of the turbomachine blade.

17. The steam turbine blade as claimed in claim 2, wherein the chord length in the middle region of the longitudinal extent is less than 82%, of the maximum chord length of the blade airfoil and is the shortest chord length of the turbomachine blade.

18. The steam turbine blade as claimed in claim 2, wherein the chord length ($s_m$) in the middle region of the longitudinal extent is more than 75%, of the maximum chord length of the blade airfoil and is the shortest chord length.

19. The steam turbine blade as claimed in claim 2, wherein the chord length ($s_m$) in the middle region of the longitudinal extent is more than 78%, of the maximum chord length of the blade airfoil and is the shortest chord length.

* * * * *